S. D. Simmons,
Bread Cutter,
No 48,985. Patented July 25, 1865.

Witnesses: Inventor:

UNITED STATES PATENT OFFICE.

S. D. SIMMONS, OF SAN FRANCISCO, CALIFORNIA.

BREAD-CUTTER.

Specification forming part of Letters Patent No. 48,985, dated July 25, 1865.

*To all whom it may concern:*

Be it known that I, S. D. SIMMONS, of San Francisco, in the county of San Francisco and State of California, have invented new and useful Improvements in Bread-Cutting Machines; and I do hereby declare that the following is a full, clear, and exact description thereof, which will enable others skilled in the art to make and use the same, reference being had to the accompanying drawings, forming part of this specification.

The present invention consists in the use of a series of knife-blades fixed at one end and at short and equal distances apart to and upon a common shaft turning in bearings of a stationary box or platform and having a suitable handle, by which, first placing the loaf of bread to be cut or sliced in proper position upon the platform, the knives are simultaneously made to cut the same, as will be presently described.

Figure 2:
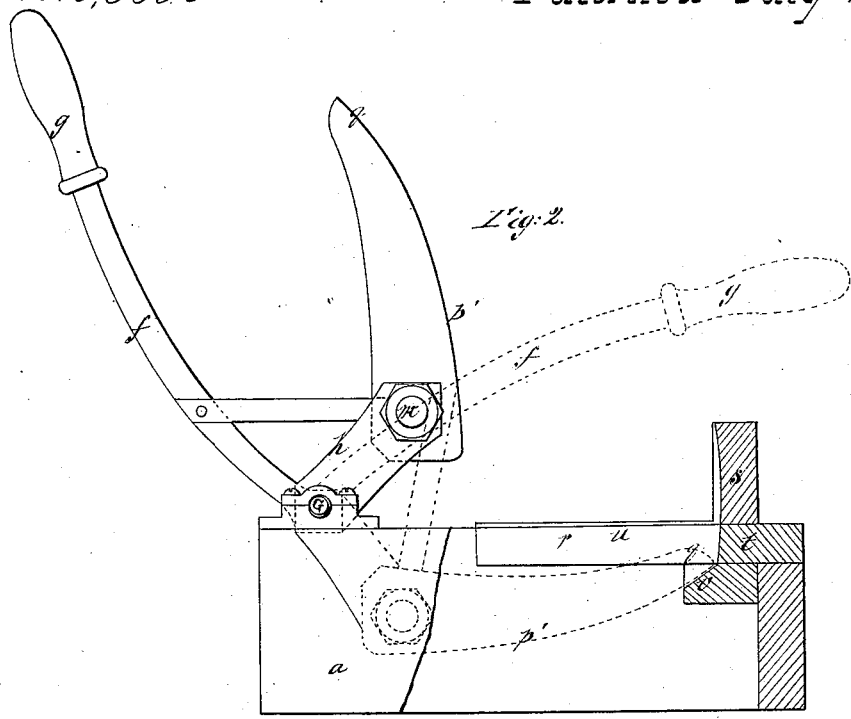
Figure 1:
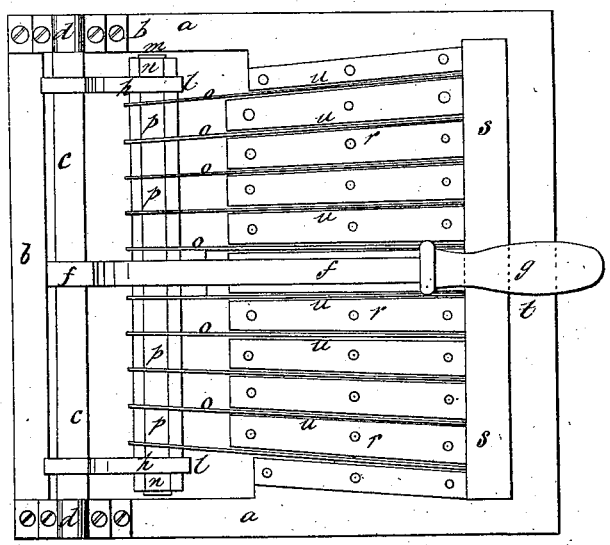

In the accompanying plate of drawings my improvements are represented, Figure 1 being a plan or top view of knives and the platform, and Fig. 2 a side view of same, showing the two extreme positions of the knives, upper and lower, and a portion of the box in section.

*a a* in the drawings represent the box or platform of the machine, across the upper end portion, *b*, of which is a horizontal shaft, *c*, turning in bearings *d d* at each end. At the center of the shaft *c* is a projecting arm, *f*, having handle *g* at its outer end for convenience in turning. *h h* are short projecting arms at each end of the shaft *c*, connected together at their outer end, *l l*, by a rod, *m*, passing through them, and secured by screw-nuts *n n* at each end. On this rod *m* a series of knife-blades, *o o*, are placed at short and equal distances apart, separated by a series of collars, *p p*, placed between each blade and of equal width to the space between the same. These knives are secured by their larger ends to the rod *m*, as described, and project outward therefrom, with their edges *p'* made of a curved shape and sharpened in any proper manner and of a tapering form toward their outer ends, *q q*.

*r* is the platform on which the loaf of bread to be cut into slices is placed, having a raised edge or piece, *s*, along its end *t*, and provided with a series of narrow cross-slots, *u u u*, extending entirely through the same at same distances apart as the knife-blades before referred to, and of sufficient width to allow the blades to freely pass through the same, as will be described.

In the use of my improved bread-cutter, arranged as above described, first place the loaf of bread to be cut upon and across the platform *r* and against the inner surface of its projecting edge *s;* then, grasping the handle *g* with the hand, pull it toward the same, thus forcing the knives attached thereto through the bread, cutting it into equal and similar slices, according to the distance at which they are set apart upon their common shaft, when, passing down through the slots in the platform, they come to a bearing against the shoulder *v* of the box *a*. The bread-slices are then removed from the platform and the knives swing back to their original position in readiness to be used again, if desired.

The knife-blades can be as well attached to the handle-shaft in lieu of between its projecting arms, as described, and they can also be made of various shapes and lengths other than those represented in the drawings and herein described.

From the above description it is apparent that the knife-blades can be easily and readily removed for sharpening or for inserting new ones; and, furthermore, it is evident by so arranging upon a shaft a series of knives as to be simultaneously moved by a common handle attached to said shaft, that a loaf of bread can be instantly and with one motion of the handle entirely cut into slices of the desired width, the advantages of which are many and especially important where the consumption of bread is large—as, for instance, in hotels, restaurants, dining-saloons, &c.

I claim as new and desire to secure by Letters Patent—

The bread-cutter described, the same consisting in attaching and arranging upon a suitable shaft a series of knife-blades of any desired number and size and at proper distances apart, said shaft being provided with a suitable handle and arranged and operating with regard to the fixed platform used for receiving the bread to be cut, substantially in the manner as hereinabove set forth.

The above specification of my invention signed by me this 3d day of May, 1865.

SAMUEL D. SIMMONS.

Witnesses:
J. W. McKENZIE,
P. B. QUINLAN.